United States Patent [19]
Brenig

[11] Patent Number: 4,577,332
[45] Date of Patent: Mar. 18, 1986

[54] DIGITAL DECODING ARRANGEMENT

[75] Inventor: Theodore Brenig, Lynchburg, Va.

[73] Assignee: General Electric Company, Schenectady, N.Y.

[21] Appl. No.: 474,788

[22] Filed: Mar. 14, 1983

[51] Int. Cl.⁴ .................................................. H04L 1/02
[52] U.S. Cl. ....................................... 375/40; 375/100; 371/69
[58] Field of Search ................... 375/17, 94, 95, 100, 375/40, 99, 75, 102; 455/33, 54, 133, 134, 135, 296, 303; 371/67, 68, 69; 340/521

[56] References Cited

U.S. PATENT DOCUMENTS

| | | | |
|---|---|---|---|
| 3,476,922 | 11/1969 | Yiotis | 235/153 |
| 3,689,802 | 9/1972 | Waldmann | 361/86 |
| 3,703,706 | 11/1972 | Ogura et al. | 371/69 |
| 3,757,226 | 9/1973 | Stover | 375/99 |
| 3,860,872 | 1/1975 | Richardson et al. | 455/135 |
| 3,879,665 | 4/1975 | Carlow et al. | 375/99 |
| 3,895,223 | 7/1975 | Neuner et al. | 371/68 |
| 3,906,445 | 9/1975 | Beckmann et al. | 371/69 |
| 3,978,408 | 8/1976 | Gupta et al. | 455/133 |
| 4,063,174 | 12/1977 | Gupta et al. | 455/135 |
| 4,099,121 | 7/1978 | Fang | 375/40 |
| 4,128,809 | 12/1978 | Kage | 375/100 |
| 4,197,502 | 4/1980 | Sumner et al. | 375/75 |
| 4,199,799 | 4/1980 | Ostenso et al. | 328/117 |
| 4,200,838 | 4/1980 | Poitevin | 371/69 |
| 4,232,392 | 11/1980 | French | 455/54 |
| 4,264,955 | 4/1981 | Goodwin | 364/510 |
| 4,297,533 | 10/1981 | Gander et al. | 375/99 |
| 4,389,616 | 6/1983 | Grockler et al. | 375/99 |

Primary Examiner—Robert L. Griffin
Assistant Examiner—Stephen Chin
Attorney, Agent, or Firm—James J. Williams; Robert C. Lampe, Jr.

[57] ABSTRACT

Digital signals transmitted twice are decoded by a receiver arrangement which determines the value and deviation of each pair of corresponding signals relative to a selected level. A weighting signal indicative of the deviation (either maximum or minimum depending on the selected level) is assigned to each signal. The value of the signal having the greater weight is selected as being correct. Thus, transmitting signals three times for a majority voting is eliminated.

6 Claims, 5 Drawing Figures

| ANALOG VALUE | CORRESPONDING BINARY NUMBER | | | | | LOOK UP TABLE ASSIGNMENT | |
|---|---|---|---|---|---|---|---|
| | 16 | 8 | 4 | 2 | 1 | TERNARY VALUE | WEIGHT |
| 1.9 | 1 | 0 | 0 | 1 | 1 | 2 | 4 |
| 1.8 | 1 | 0 | 0 | 1 | 0 | 2 | 3 |
| 1.7 | 1 | 0 | 0 | 0 | 1 | 2 | 2 |
| 1.6 | 1 | 0 | 0 | 0 | 0 | 2 | 1 |
| 1.5* | 0 | 1 | 1 | 1 | 1 | 2 | 0 |
| 1.4 | 0 | 1 | 1 | 1 | 0 | 1 | 0 |
| 1.3 | 0 | 1 | 1 | 0 | 1 | 1 | 1 |
| 1.2 | 0 | 1 | 1 | 0 | 0 | 1 | 2 |
| 1.1 | 0 | 1 | 0 | 1 | 1 | 1 | 3 |
| 1.0* | 0 | 1 | 0 | 1 | 0 | 1 | 4 |
| 0.9 | 0 | 1 | 0 | 0 | 1 | 1 | 4 |
| 0.8 | 0 | 1 | 0 | 0 | 0 | 1 | 3 |
| 0.7 | 0 | 0 | 1 | 1 | 1 | 1 | 2 |
| 0.6 | 0 | 0 | 1 | 1 | 0 | 1 | 1 |
| 0.5* | 0 | 0 | 1 | 0 | 1 | 1 | 0 |
| 0.4 | 0 | 0 | 1 | 0 | 0 | 0 | 0 |
| 0.3 | 0 | 0 | 0 | 1 | 1 | 0 | 1 |
| 0.2 | 0 | 0 | 0 | 1 | 0 | 0 | 2 |
| 0.1 | 0 | 0 | 0 | 0 | 1 | 0 | 3 |
| 0.0 | 0 | 0 | 0 | 0 | 0 | 0 | 4 |

* SELECTED LEVELS

FIG. 4

|  | WORD 1 | | | WORD 2 | | | SELECTED TERNARY WORD | RESULTANT TERNARY SIGNAL |
|---|---|---|---|---|---|---|---|---|
| TIME | ANALOG VALUE | ASSIGNED TERNARY VALUE | ASSIGNED WEIGHT | ANALOG VALUE | ASSIGNED TERNARY VALUE | ASSIGNED WEIGHT | | |
| T1 | 0.3 | 0 | 1 | 0.1 | 0 | 3 | WORD 2 | 0 |
| T2 | 0.9 | 1 | 4 | 0.4 | 0 | 0 | WORD 1 | 1 |
| T3 | 1.2 | 1 | 2 | 1.2 | 1 | 2 | WORD 1 | 1 |
| T4 | 1.9 | 2 | 4 | 1.7 | 2 | 2 | WORD 1 | 2 |
| T5 | 0.1 | 0 | 3 | 0.6 | 1 | 1 | WORD 1 | 0 |
| T6 | 1.0 | 1 | 4 | 0.7 | 1 | 2 | WORD 1 | 1 |
| T7 | 0.2 | 0 | 2 | 0.1 | 0 | 3 | WORD 2 | 0 |
| T8 | 1.8 | 2 | 3 | 1.3 | 1 | 1 | WORD 1 | 2 |

DIGITAL DECODING ARRANGEMENT

BACKGROUND OF THE INVENTION

My invention relates to an arrangement for digital decoding, and particularly to an arrangement for decoding digital information or data transmitted over a medium that may distort the digital information or data during its transmission.

Digital information or data is being used more frequently and in more applications because of its ability to be transmitted at relatively high speeds and its ability to be recreated after transmission. However, errors can occur in the digital information when the communication medium becomes relatively noisy, as it may in radio and wire systems; or where the communication medium is subject to fast fading, such as in mobile radio systems. Because of this, digital information is frequently transmitted a plurality of times to insure reliable and accurate reception. One well known system transmits each digital signal three times, either in direct sequence, or in digital words which are transmitted three times. At the receiving end, the digital signals are detected, and a majority vote is taken on each of the correponding three digital signals. In the case of binary signals, if three logic 1's or if two logic 1's and one logic 0 are received, then a decision is made that a logic 1 was received. On the other hand, if three logic 0's or if two logic 0's and one logic 1 are received, then a decision is made that a logic 0 was received. This system is fairly accurate, as its decision is based on at least two out of three repeated digital signals being the same.

While such a system works well, and provides relatively reliable and accurate signals, such a system requires that each digital signal be transmitted at least three times. Such a requirement utilizes a relatively valuable communication medium for a relatively long length of time, since each digital message must be transmitted three times in sequence. Accordingly, there is a need for a digital decoding arrangement that is reliable and accurate, and that reduces the required time for transmitting the digital signals over a communication medium.

SUMMARY OF THE INVENTION

Briefly, a digital decoding arrangement in accordance with my invention requires that a digital signal be transmitted only twice. In my arrangement, each received digital signal is valued either above or below a selected level, and each received digital signal is weighted as a function of its deviation from or closeness to the selected level. The weights of each pair of corresponding signals are compared, and the value of the digital signal having the greater weight is selected. Thus, my arrangement has a reliability or accuracy that is the same as or better than prior art systems which takes a majority vote on three signals; and my arrangement requires only two transmissions of each digital signal.

BRIEF DESCRIPTION OF THE DRAWING

The subject matter which I regard as my invention is particularly pointed out and distinctly claimed in the claims. The structure and operation of my invention, as well as advantages, may be better understood from the following description given in connection with the accompanying drawing, in which:

FIGS. 4 and 5 show tables for explaining the decoding of the wave forms of FIG. 3.

DESCRIPTION OF THE PREFERRED EMBODIMENT

Figure 1:
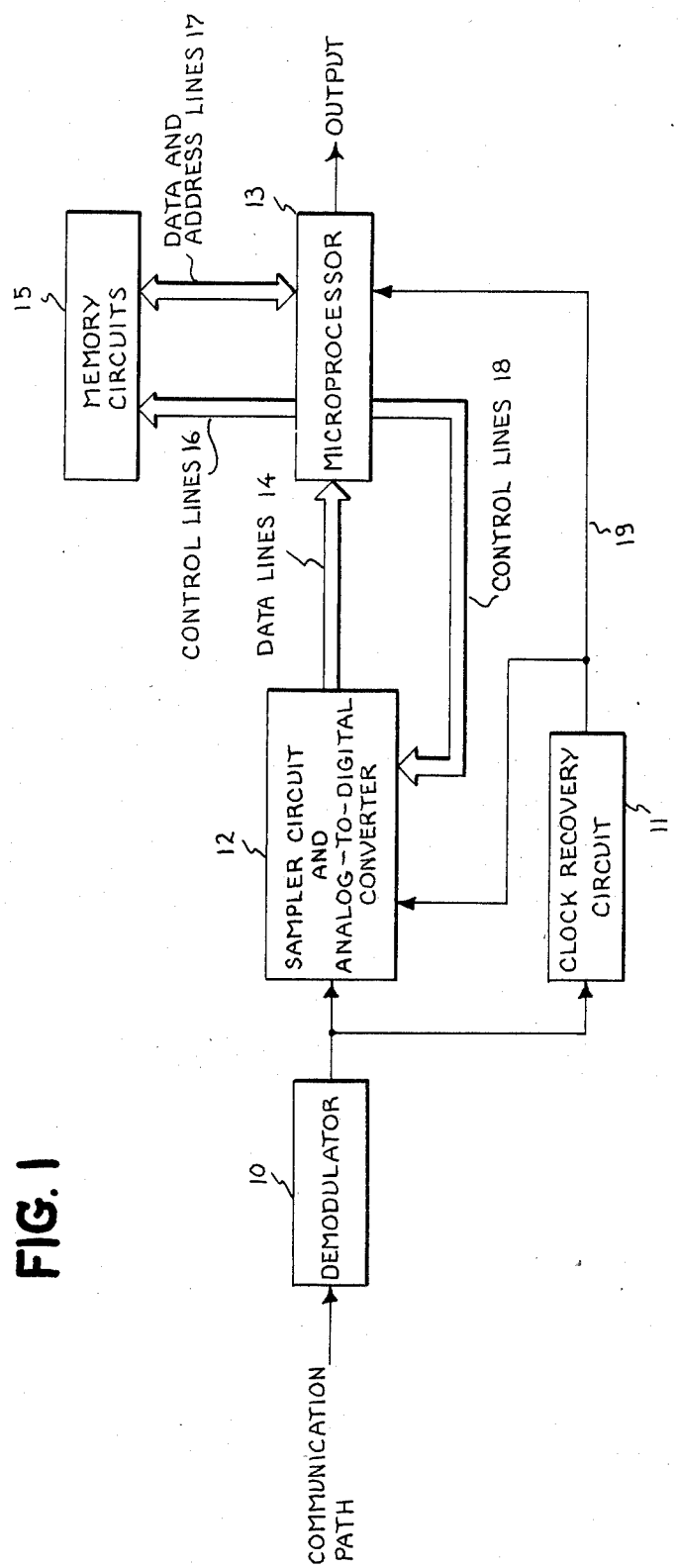
FIG. 1 shows a block diagram of a digital decoding arrangement in accordance with my invention.

FIG. 1 shows a block diagram of a preferred embodiment of a digital information decoding arrangement in accordance with my invention. This digital information may be transmitted over a communication medium which may include a radio circuit, or a wire circuit, or a combination of such circuits. Typically, the digital information being transmitted is in binary form. However, my invention can be used with multilevel digital information and I will explain the operation for digital information transmitted in three level or ternary form. With that explanation, persons skilled in the art will be able to use my invention with two level or binary form, or as many levels as needed. The levels of the digital information may be indicated in any suitable fashion, such as frequencies which modulate a carrier, or frequencies themselves, either of which can represent the multilevels of digital information. The incoming signals are applied to a demodulator 10 which produces an output in analog form, such as shown in FIG. 3B. The demodulated signals are applied to a clock recovery circuit 11 which provides relatively stable clock signals having the same frequency or data rate as the incoming digital information signals. The clock signals are applied over a line 19 to a sampler circuit and analog-to-digital converter 12 and to a microprocessor 13 to provide synchronized decoding. The circuit and converter 12 may take various forms, and the microprocessor 13 may be replaced by other logic circuits to provide the functions of my invention. The demodulated signals are also applied to the sampler circuit and analog-to-digital converter 12, which samples each demodulated signal preferably at its midpoint with respect to time, and produces a binary output representing the amplitude of the analog signal when sampled. The analog-to-digital converter 12 is designed to operate with the output range of the demodulator 10 so that the converter 12 can handle that range and produce the needed digital signals. While I explain my invention in terms of 20 amplitudes of the sampled analog signals to make the explanation relatively simple, persons skilled in the art will appreciate that as many amplitudes and hence resolution as desired may be utilized. The binary signals representing amplitude are supplied by the converter 12 over data lines 14 to the microprocessor 13 which can be programmed to perform decoding in accordance with my invention. The microprocessor 13 controls the sampler and converter 12 by control lines 18. The microprocessor 13 is provided with memory circuits 15, some of which may be read-only memories, and some of which may be random access memories. The memory circuits 15 and the microprocessor 13 are connected by control lines 16 and by data and address lines 17. As will be explained, an output is selected from one of the corresponding twice-received digital signals by the microprocessor 13 in accordance with the weighting applied to those corresponding twice-received signals.

Figure 2:
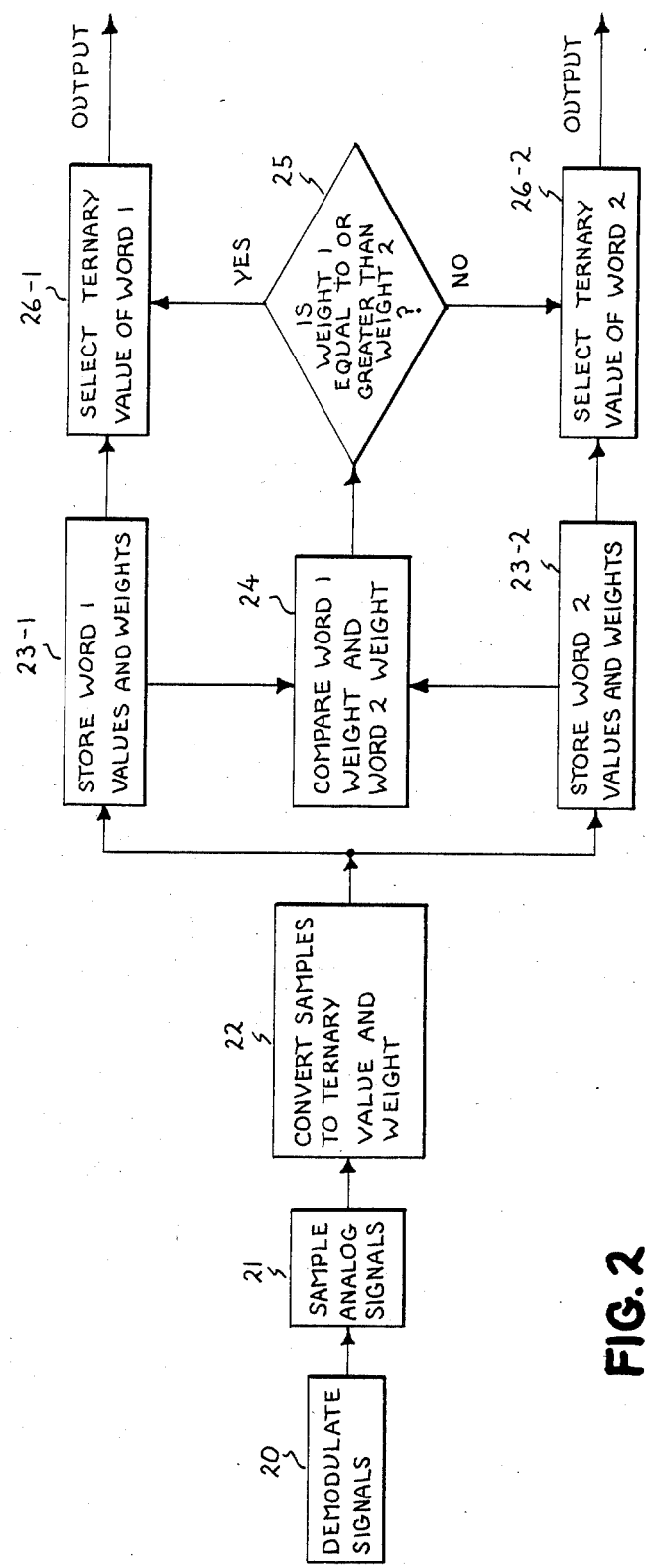
FIG. 2 shows a flow diagram illustrating the operation of my digital decoding arrangement of FIG. 1.

FIG. 2 shows a flow diagram that is helpful in understanding the functions which take place in my circuit arrangement of FIG. 1. The incoming signals are detected and demodulated as indicated by the block 20. The demodulated signals are in analog form and are sampled as indicated by the block 21. These samples are preferably made at the midpoint of the time duration of each signal, and this can be achieved by the proper clock signal and the microprocessor. The analog samples are then given a ternary value, either 0, or 1, or 2, depending on whether the samples are above or below selected levels; and are given a weight in accordance with the deviation from the selected levels, as indicated by the block 22. The ternary value and weight of each first signal are stored as indicated by the block 23-1, and the ternary value and weight of each corresponding second (i.e. repeated) signal are stored as indicated by the block 23-2. As will be appreciated by persons skilled in the art, the repeated digital signals may occur in direct time sequence, or may occur at corresponding times in a sequence of two words or groups of signals. In the latter case where a word is transmitted twice, the ternary values and weights of each of the signals of the first word and the ternary values and weights of each of the signals of the second word are stored in respective storage locations of the memory circuits 15. As a consequence, the storage must be able to retain all of the ternary signals forming the two words in the proper order so that the microprocessor 13 can make a comparison between the corresponding weights of the ternary signals of the two words. The weights of the corresponding ternary signals of the two words are compared as indicated by the block 24 and applied to a decision making process 25 in the microprocessor 13 which determines which weight is the greater. If weight 1 (of a ternary signal of word 1) is equal to or greater than weight 2 (of the corresponding ternary signal of word 2), then the microprocessor 13 selects the ternary value of the signal of word 1 as indicated by the block 26-1. However, if weight 2 is greater than weight 1, then the ternary value of the signal of word 2 is selected as indicated by the block 26-2.

Figure 3:
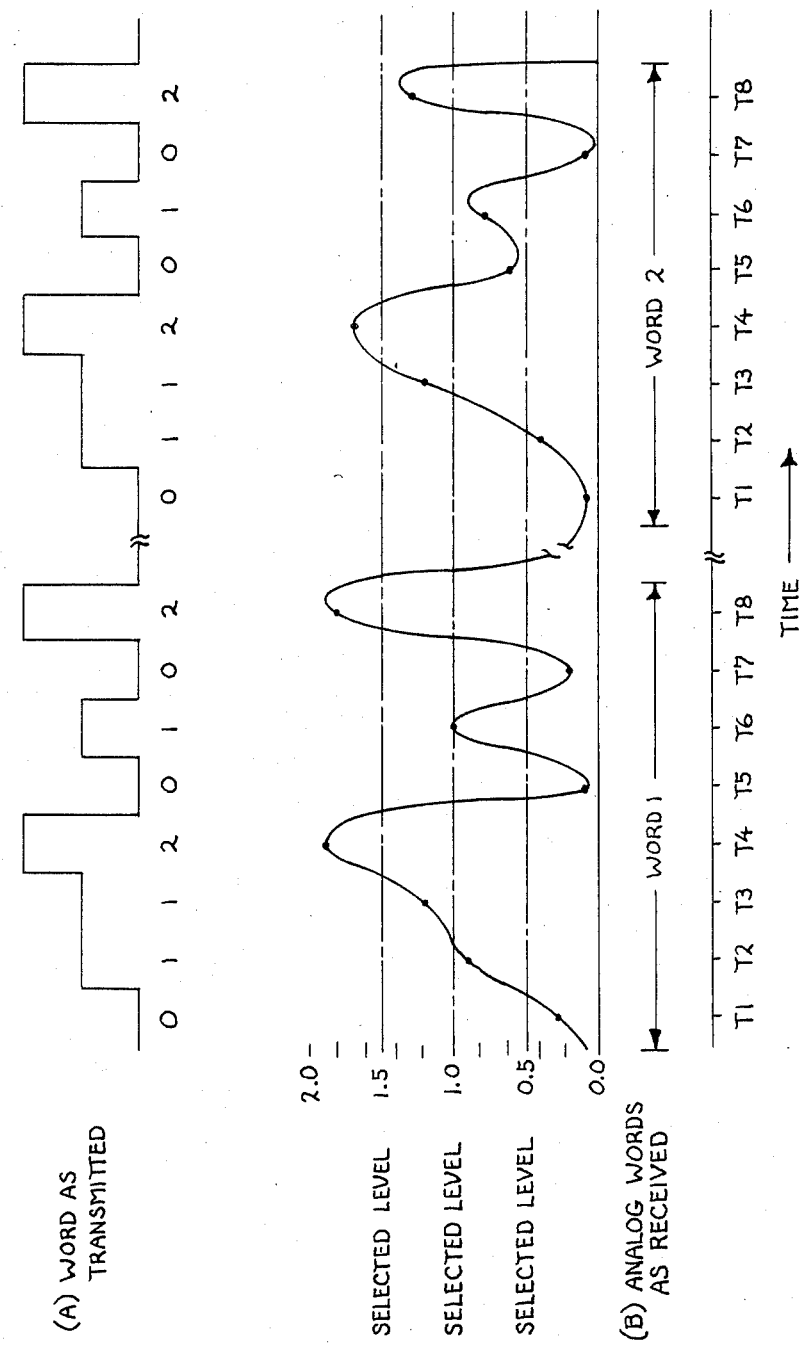
FIG. 3 shows wave forms further illustrating the operation of my digital decoding arrangement.

The operation of the arrangement of FIG. 1 in accordance with the flow diagram of FIG. 2 is explained further in connection with the wave forms of FIG. 3 and the tables of FIGS. 4 and 5. In this explanation, I have assumed that a digital word comprising 8 individual digital signals is transmitted twice, as shown in FIG. 3A. Each of these words comprise the same ternary values of 01120102 transmitted the first time as word 1, and transmitted again a second time as word 2. FIG. 3B shows the analog signals as received over the communication medium. In FIG. 3B, I have assumed that the arrangement of FIG. 1 assigns 20 amplitudes or levels between 0 and 2, and that there are selected or threshold levels at 0.5, 1.0, and 1.5. The sampling times for each of the signals of the two words is indicated along the common time axis as T1 through T8 respectively. The dots on the analog signals of FIG. 3B represent the amplitude or level when a sample is taken. In FIG. 5, these levels are numerically given in the analog values for word 1 and word 2 respectively. In FIG. 3B, I have assumed that word 2 is corrupted by more noise or underwent more distortion or fading than word 1, resulting in more deviation from the ideally received values. Hence common sense indicates that more of the values of word 1 should be utilized. As will be explained in connection with FIG. 5, more of the word 1 values are selected.

FIG. 4 shows a table illustrating how the arrangement of FIG. 1 and the flow diagram of FIG. 2 provide the assigned ternary values and weights to the incoming analog signals. The left column of FIG. 4 shows the 20 analog values which are assigned for the samples of the analog signals. The central column shows the corresponding binary numbers for these analog values, and since there are 20 such values, 5 binary values having decimal significances of 1, 2, 4, 8, and 16 are needed. These binary numbers, when produced by the analog-to-digital converter 12, are applied to the microprocessor 13 over the data lines 14. The microprocessor 13, in cooperation with its memory circuits 15, causes the memory circuits 15 to look up a corresponding ternary value and weight in a table which is stored in the memory circuits 15. Each of the respective ternary values and weights are listed for the corresponding analog values and binary numbers.

As mentioned earlier, I have provided selected levels or thresholds at the analog values of 0.5, 1.0, and 1.5. Thus, for the selected level of 0.5 and assigned ternary values of 0, it will be noted that signal deviations downward from 0.5 are given increasingly greater weights. That is, the signal is farther from the selected level. However, for the selected level or threshold of 1.0, and the corresponding ternary values of 1, greater weights are assigned for signals nearer to the selected level of 1.0, with decreasing weights as the signal deviation from 1.0 increases. And finally, for the selected level or threshold of 1.5 and assigned ternary values of 2, increasing weights are assigned as the deviation increases upward from 1.5. The significance of this is graphically illustrated in FIG. 3B. For the selected level of 0.5 and ternary values of 0, a received signal is likely to be more accurately indicated as a ternary 0 as the deviation below 0.5 increases. Likewise, a received signal of ternary value 2 is more likely to be accurately received as the deviation increases above the selected level of 1.5. And finally, a received ternary value of 1 is more likely to be accurate as its deviation from the selected level of 1.0 decreases, or its closeness to the selected level of 1.0 increases.

In the table of FIG. 5, the left column indicates the times T1 through T8 that word 1 and word 2 are respectively received. The left column under word 1 or word 2 is the analog value of the signal when sampled. It will be seen that these analog values correspond or agree with the analog values indicated by the dots on the wave forms of FIG. 3B. When these analog values are produced by the sampler circuit 12, they are converted to the binary numbers shown in FIG. 4, and the microprocessor 13 looks up the proper ternary value and weight from the memory circuits 15. Thus at the time T1 for the analog value of 0.3 of word 1, FIG. 4 shows that the lookup table assignment provides a ternary value of 0 and a weight of 1. For word 2, the analog value of 0.1 has an assigned tetnary value of 0 and an assigned weight of 3. In other words, the sampled analog signal of word 2 is further from or deviates more from the selected level of 0.5, which indicates that the analog value of word 2 is more likely to be correct. Hence, the microprocessor 13 selects word 2 as indicated by the decision block 25 in FIG. 2. And, the selection of word 2 provides a ternary signal of 0. As shown in FIG. 3A at the time T1, this is the correct choice.

Similar operations for the times T2 through T8 are also provided for words 1 and 2. Another example will be explained as to how my arrangement makes the proper decision. At the time T2, word 1 has a received analog value of 0.9, but word 2 has a received analog value of 0.4. The analog value of 0.9 provides an assigned ternary value of 1 and an assigned weight of 4, whereas the analog value of 0.4 has an assigned ternary value of 0 and an assigned weight of 0. Since the assigned weight of word 1 is 4 and is greater than the assigned weight of 0 for word 2, the microprocessor selects word 1. The resultant ternary signal is a 1, which as shown by FIG. 3A, is the correct choice.

At the time T3, it will be noted that the analog values of words 1 and 2 are both 1.2, which results in both assigned ternary values being 1, and both assigned weights being 2. As indicated by the decision block 25 in FIG. 2, these equal weights result in word 1 being arbitrarily chosen. Word 2 could have been selected under this condition, since it is an arbitrary decision. In either case, the correct resultant ternary signal of 1 would be provided.

It will thus be seen that I have provided a new and improved data decoding arrangement which provides reliable and accurate decoding of digital signals that are transmitted only twice. In my above explanation, I have used weights based on the deviation from or nearness to a selected level. Hence, I intend to include within the scope of my invention such weights, however handled. My arrangement reduces the time required for transmission by one-third over the systems where messages are transmitted three times for a two out of three voting arrangement. And, my arrangement is substantially as or even more accurate than the two-out-of three voting arrangement. Persons skilled in the art will appreciate the modifications that may be made to my invention. For example, discrete logic circuits can be used in place of the microprocessor. Any desired or practical number of discrete analog values may be used, with corresponding assigned values and weights provided in the lookup tables. And as already mentioned, two level (binary) signals or multilevel signals of four or more levels can be decoded by using the proper number of selected levels. A two level or binary signal would of course require only one selected level. A four level signal could be decoded with three selected levels. My arrangement can be used in systems where each digital signal is repeated in direct sequence rather than in words that are repeated in sequence. The analog signals shown in FIG. 3B can be compared on a strictly analog basis. However, such analog comparison circuits do not readily lend themselves to binary systems currently in use in many applications. Likewise, signals of word 2 could be arbitrarily selected where the signal weights or deviations are equal.

Therefore, while my invention has been described with reference to a particular embodiment, it is to be understood that modifications may be made without departing from the spirit of the invention or from the scope of the claims.

What I claim as new and desire to secure by Letters Patent of the United States is:

1. An arrangement for decoding analog signals forming a binary meassage and transmitted at least twice in sequence, comprising:
    a. means for producing a first digital value signal in response to each received analog signal above a selected level and for producing a second and different digital value signal in response to each received analog signal below said selected level;
    b. means for producing a wighting factor that is related to the deviation of each received analog signal from said selected level;
    c. and means for selecting one digital value signal produced from corresponding and repeated analog signals, said one selected digital value signal having the highest weighting factor associated therewith.

2. The arrangement of claim 1 wherein said selected level is substantially midway between the maximum and minimum deviations of said analog signals.

3. A method of decoding a digital message comprised of multilevel signals, each of which is received at least twice in a sequence, comprising the steps of:
    a. setting one or more levels about which said multilevel signals deviate;
    b. determining whether each signal is greater or less than one of said set levels, and assigning a corresponding value to each of said signals;
    c. determining the deviation of each signal from one of said set levels, and assigning a corresponding weight to each of said signals;
    d. comparing the weight of each signal received first with the weight of each corresponding signal received second;
    e. and selecting the one of said corresponding signals having the greater weight.

4. The method of claim 3 wherein said selection includes using the assigned value of said signal having the greater weight.

5. The method of claim 3 wherein said each of assigned weights is selectively based on how close or how far said signals are relative to said selected levels.

6. The method of claim 4 wherein said each of assigned weights is selectively based on how close or how far said signals are relative to said selected levels.

* * * * *